June 16, 1931.  E. RIEMENSCHNEIDER  1,810,112
PROCESS FOR WELDING METAL TUBING
Filed Aug. 6, 1930    2 Sheets-Sheet 1
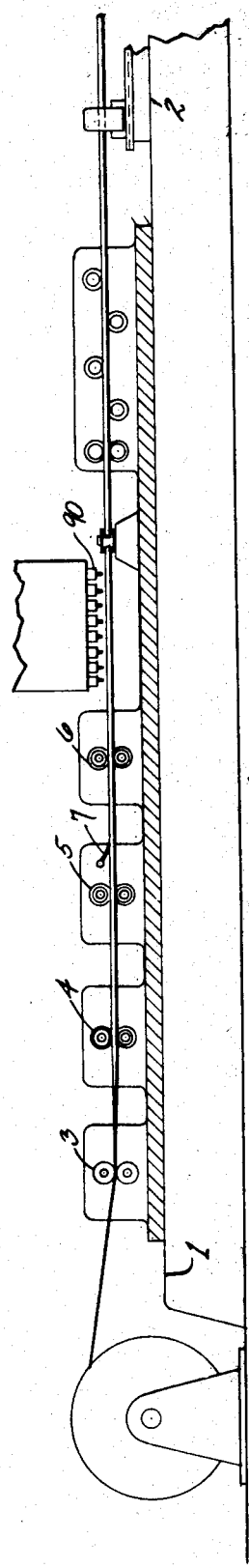
Inventor
Ernest Riemenschneider,
By Justin W. Macklin.
his Attorney June 16, 1931.  E. RIEMENSCHNEIDER  1,810,112

PROCESS FOR WELDING METAL TUBING

Filed Aug. 6, 1930  2 Sheets-Sheet 2

INVENTOR
Ernest Riemenschneider,
BY Justin W. Macklin,
his ATTORNEY

Patented June 16, 1931

1,810,112

UNITED STATES PATENT OFFICE

ERNEST RIEMENSCHNEIDER, OF CLEVELAND, OHIO, ASSIGNOR TO THE MIDLAND STEEL PRODUCTS COMPANY, OF CLEVELAND, OHIO, A CORPORATION OF OHIO

PROCESS FOR WELDING METAL TUBING

Application filed August 6, 1930. Serial No. 473,484.

This invention relates to a continuous process and apparatus for welding metals, such for example as structural members and the like, and is more particularly concerned with the manufacture of welded tubing from comparatively thick steel strip.

In the manufacture of welded metal tubing a common practice is to pass the metal through a welding apparatus in which a metal welding rod forms one of the electrodes, and the stock material forms the other electrode, so that the welding rod is melted into the closing seam of the tube. The welding by the rod method not only requires comparatively expensive and bulky equipment, but produces a welding seam which is rough and irregular, due to the excess material added. Furthermore, the weld formed by the use of such rod processes is not as satisfactory as when the metal is welded by proper heating and working of the stock without the addition of other material.

To overcome these difficulties methods of forming welded tubing by arc welding, without the use of welding rods, have been devised and some of these arc welding methods have given satisfactory results.

My invention comprises an improvement in existing arc welding methods and its objects include greatly increasing the speed of welding and at the same time producing a better weld and finished product, especially in the case of large diameter tubing made from comparatively thick strip stock.

It is a further improvement in that it is effective in treating with all of the generally used gages of stock material, and requires less manual handling of the material than the present processes.

Previous methods require cleaning of the stock for electrode contacts and machine treatment for preparation of the edges to be welded, and an object of the present invention is to eliminate these expensive processes.

One of the objects of my invention is to provide a continuous process and apparatus for welding comparatively thick stock materials at a very much greater speed than heretofore attained.

Another object is the welding of such material so that the welded seam is practically homogeneous with the parent body of the material and the welded product is free from porosity and other defects which often result from improper heating or cooling.

Another object of my invention is to control accurately the quality of the weld.

Other objects and advantages of our invention will become apparent from the following specifications in which reference is made to the drawings.

In the drawings—

Fig. 1 is a somewhat diagrammatic side elevation of an apparatus suitable for carrying out our process.

Fig. 2 is an enlarged longitudinal sectional view of the arc welding unit and adjacent apparatus illustrated in Fig. 1, illustrating the weld upset reducing means.

Fig. 3 is a cross sectional view taken on a plane indicated by the line 3—3 of Fig. 2.

Figure 4:
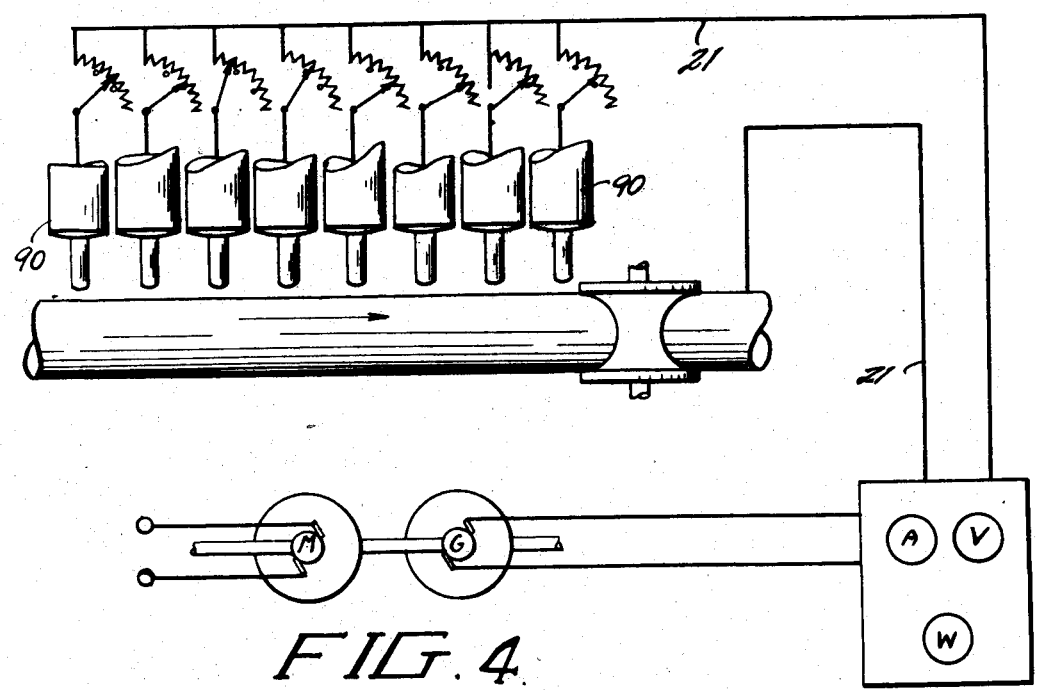
Fig. 4 is a somewhat diagrammatic illustration of the arc welding units of my invention and the electric circuit and controls therefor.

Since preheated material produces a weld of better quality, it is desirable in the welding of metals that the temperature of a comparatively large portion of the material adjacent to the portion actually welded be heated at the same time that the temperature of the portion to be welded is raised to welding heat. Likewise if a large body of the material is heated, the welded portion cools more gradually, and as a result the porosity occasioned by too quick cooling of the weld is eliminated and the finished product is somewhat annealed.

The application of these facts will be more fully set forth in the following description of my process, which will be described as applied to welded tubing. It should be noted, however, that I do not intend to limit my invention to use in connection with tube welding but have described this one use for purposes of illustration of an important use of this invention.

Briefly, the steps of my process include passing the strip stock through suitable forming dies or rolls by which it is formed into a tube of the desired cross section and the original edges of the strip are brought close together, defining an open longitudinal seam.

From this operation the tube passes under and close to a plurality of cascaded electric arcs i. e. arcs arranged for increment or progressive heating. For this purpose I use an arc welding apparatus preferably of a type in which carbon electrodes constantly revolve about their axes. In such a welding apparatus the position of the arc may be controlled accurately, as will later be described. The voltage and amperage supplied to each of these electrodes may be varied independently and the arc produced by each electrode may be regulated independently of the arcs of the other electrodes. Electrodes containing substances to produce a non-oxidizing atmosphere or gas are desirable, as such atmosphere prevents oxidation of the welding.

These electrodes are spaced apart a short distance from each other and all may operate simultaneously. As the strip passes therebeneath, the temperature of a portion thereof is raised a predetermined amount by each electrode, the last few electrodes in the direction of movement raising the temperature to welding heat. During the passage of the tube past these last electrodes the inner surface near the abutting edges is supported on a suitable welding shoe of highly refractory metal and maintained at a suitable high temperature to facilitate welding.

As the tubing passes over the welding shoe the temperature of a portion of the metal along the seam to be welded is sufficiently increased to actually melt the metal to a liquid state, so that it flows forming a molten stream or long narrow pool confined along the sides by the hot unmelted metal of the strip and beneath by the welding shoe. One advantage of so melting the metal is that scale or foreign matter along the portion welded may float up to the surface of the molten metal and then out of the seam. As a result the seam is filled only with the purer metal. An additional advantage of so melting the metal resides in the fact that the stock is melted back a distance from the original edges or seam on each side. Consequently it is not necessary that the original edges of the strip be spaced the same distance apart or positioned exactly in a straight line parallel to the direction of the movement of the tube, as variations of the metal edges on either side of theoretical line of weld will be melted off and reformed. While the metal is in this molten state, and supported and retained on the shoe, and between the adjacent edges, these edges of the tube may be brought nearer to each other to form the weld and raise any oxide or other foreign matter out of the weld. This may be accomplished conveniently by passing the tube between pressure forming or upset producing rolls or other suitable means which squeeze the heated edges toward each other to complete the weld.

As soon as the molten metal has set or cooled sufficiently the tube immediately passes between a suitable number of upset or seam reducing rollers, and at the same time about a bar with suitable small rollers mounted therein to reduce the weld, as will later be described. If desired, this bar may be in the form of a mandrel conforming to the inner contour of the finished tube. The upset reducing rollers may further squeeze the tube edges together and since the tube is heated and supported both on the outside and on the inside concurrently, the weld is smoothed out and the tube brought to the desired cross section. This action not only produces a tube of the proper cross sectional shape, but also squeezes the somewhat plastic heated metal so that an effective seam is formed. Thus the welded section and the remainder of the pipe are rolled so as to be practically homogeneous, the resulting tube being substantially a seamless tube.

The tube may then be passed through suitable straightening rolls and then into a moving or "flying" cutoff mechanism of any of the usual types which cut it in the desired length.

As above mentioned, it is desirable that the metal adjacent to the weld be preheated before the actual welding operation. This is one of the results accomplished by the use of the present invention. The arcs toward the approaching strip may be spaced apart a distance such that the concentrated heating effect of each arc has time to spread from the point of application outwardly through a substantial portion of the adjacent stock. The coacting series of arcs causes a gradual rise in temperature over a larger area of the stock than is possible when using isolated units or single arc. In this manner a predetermined amount of stock may be preheated to suitable temperature. Obviously assuming the rate of movement of the strip to be constant, by regulating the intensity of the remaining arcs or by spacing them very closely together, the heating effect can be concentrated along a narrow path so as to melt the metal or bring it up to welding temperature quickly.

By using a plurality of arcs, preferably independently regulatable arcs, instead of a single arc, the rate at which the strip may be welded is increased many times the proportional increase in the number of arcs and a quality of weld is obtainable which cannot be duplicated by the use of a single arc at any speed or arc intensity. For example on stock one quarter inch thick a weld may be made with the arc unit I contemplate using at the rate of one foot per minute. By the use of say eight arcs in the manner of this process approximately twenty five feet of weld per minute may be made.

It is generally known that the quality of the finished weld varies considerably depending upon the rate of heating, the thickness of the metal, the temperature at which the weld is finally made, and the rate of cooling. With our apparatus, later to be described, it is possible to control these rates of heating, welding, and cooling by regulating the speed at which the strip is fed into the apparatus, as well as the intensity, number and the position of the electrodes, or combinations of these factors.

Figure 9:
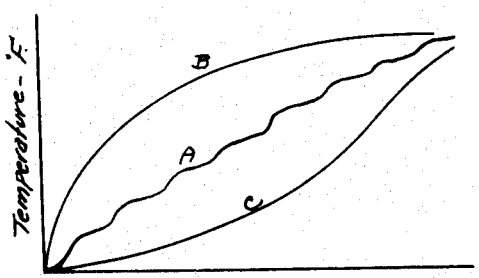
Fig. 9 is a graph of exemplary curves illustrating possible relations of times, temperatures and distances contemplated in my invention.

In Fig. 9, for instance, are given some exemplary graphs. In these graphs the ordinates represents the temperature, the abscissa representing the distance traveled by the tubing or the time of travel. For instance, as indicated by graph A, it is possible to start with a cold tube and raise the temperature thereof along and over the desired portion of the tube by cumulative steps, as it passes each arc, the intensity of the arc and the rate of movement of the tubing being held constant. For example, to raise the temperature to a welding heat of 2700° to over 3000° F., eight arcs may be used, each raising the temperature of the metal between 300° and 400° F.

On the other hand the intensity of the arcs which are toward the approaching tube or seam to be welded may be increased and the rate of movement of the tube held constant. In such case the curve such as B will be obtained, in which the metal is rapidly heated with an even rise in temperature to welding heat and then retained at such heat for some predetermined period as may be desired. In some cases it may be desirable to heat the metal slowly until close to welding temperature, and then raise the temperature rapidly through the last few hundred degrees, as indicated by the curve C. This could be accomplished by increasing the intensity of one or more of the last few arcs or by spacing them more closely together or both.

Obviously, a grouping of any of these rates of travel of the tube and spacing and intensity of the arcs may be obtained, so that any desired rate and amount of preheating, or rate and heat of welding and subsequent cooling can be accurately controlled.

For purposes of illustration, a convenient and effective apparatus for carrying out this process is shown in the drawings and includes a base 1. Carrier or other means may bring the strip stock to a plurality of forming rolls such as 3, 4, 5 and 6, operable to form a tube as the strip is progressed from left to right, the original edges of the strip being brought together to an open longitudinal seam.

Between the last of these rolls, for instance, between the sets of rolls 5 and 6, the tube is closed around a rod 7, extending through the seam ahead of its point of closure. This rod may be pivotally secured to the frame and may extend past the rollers 6 for purposes later to be described.

Beyond the rollers 6 are a plurality of arc welding electrodes 90, each of which is preferably independently controlled. As illustrated in Fig. 4 the electrodes of these units each form a terminus of an open electric circuit 21, of a voltage and amperage sufficient to produce an arc of the desired intensity at each particular electrode, depending upon the rate and amount of heating required, the size of stock, the number of electrodes used and space therebetween, etc. The metal tubing forms a common terminus for each unit. As stated I prefer to use the revolving electrode type of arc welding unit, that is, the so called "tornado arc". As illustrated in Fig. 4, each arc is independently regulatable. In these units each of the electrodes is revolved about its axis so that the tendency of the arc to localize between the electrode and some particular portion of the pipe is eliminated and the electrode is burned down evenly. This causes the arc to remain in a comparatively fixed position instead of shifting about, first to one portion of the tube and then to another.

As the tube passes the electrodes, each point is subjected to the cumulative heating effect of the cascaded arcs, each of which raises the temperature a considerable amount until, as any given seam point passes under the last few electrodes the temperature is raised to and held at welding heat. For example, if it is desired to gradually raise the temperature from starting temperature of zero to welding heat the strip may be passed under eight electrodes at a comparatively very fast rate, each electrode stepping up the temperature 300 to 400° F. until it reaches a temperature of from 2700° to 3000° F. or over, depending upon the thickness of the stock and quality of the metal tube welded. In this manner, the metal can be brought to a molten state for the purposes described.

Carried on the rod or mandrel 7 is a welding shoe 8, which engages a portion of the inside of the tubing adjacent the abutting edges as it passes beneath and shortly beyond the last few electrodes. The rod 7 is supported in proper position at this portion to hold the shoe 8 in contact with the inner surface tubing, as illustrated. Any suitable or usual method of supporting the rod may be used. An effective manner, however, is to support the rod 7 on rollers 9 which may conform to the contour of the inner surface of the tube, as illustrated. The outside of the tubing is engaged by side pressure rollers or upset producing rollers 10, which force the edges of the seam relatively together to produce the necessary upset. In this manner the tube is welded without the use of additional material. It is immediately engaged by suitable upset reducing means.

For the purpose of illustration we have used upset reducing rollers between which the tube passes, the inner surface or the part thereof adjacent to the weld being engaged by one or more small upset reducing rollers. At this position the rod 7 may be provided with a roller 16 preferably having a contour to fit the inner contour of the tube and being positioned adjacent to the seam. The underside of the rod may be supported by a plurality of rollers such as 18 and 19, though more may be used if desired. These likewise may fit the inner contour of the tube. Thus the lower part of the rod is supported on a comparatively large area of the tube, so that the upper roller 16 is held firmly against the welded seam without distorting the tube as the tube is squeezed between the upset reducing rollers 15 and the roller 16.

In Figs. 5, 6, 7 and 8 inclusive these characteristics of the tube at different progressive steps are illustrated.

Assume that the eight electrodes illustrated in Fig. 4 are in operation and the pipe is moving from left to right, and the edges 20 and 22 lie close together. A very narrow path along the tube is heated by the first electrode, as indicated by the lines 23 and 24. As the tube progresses, however, this heat spreads outwardly from the edges 20 and 22, thus preheating a portion of the tube. Each arc in succession adds to this heat, but the heat spreads less rapidly from the seam than when the metal was first started and cold. The heated zone may be indicated by the lines 23 and 24 and is of greater temperature adjacent to the edges 20 and 22, with a gradual decrease in temperature outwardly until the temperature blends gradually into the temperature of the cooler metal. When the strip has passed a number of arcs and reached a position such as indicated at 25, the edges begin to melt and as it continues, become liquid and flow in the open seam. The long narrow melted pool shown, for example, by the lines 26 and 27 is preferably wider than the original seam. The value of this is largely in that the edges need not be previously prepared nor aligned. As the metal becomes molten it is supported beneath by the welding shoe 8. After passing the last arc and while still supported the tube is engaged by the upset producing rolls described, which force the heated edges defining the seam more closely together so that the seam is decreased in width and consequently the molten metal is caused to overflow. As described, this action causes a slight overflow, floating out scale and foreign matter.

While the seam is filled with molten metal, the adjacent edges are in a semi-molten condition, the temperature gradually decreasing away from the seam. By the time that the tube has passed the upset producing rolls, the heat of the molten metal and heated edges has spread, rising the temperature of the adjacent heated stock. At the same time, the molten stream and edges have gradually cooled.

As a result, the change in the temperature of the welded portion of the tube as it cools from its molten condition does not define a sharp line, but a gradual decrease outwardly, as indicated by the lines at 30. Thus a portion of the tubing adjacent to the weld cools as a whole comparatively slowly so that the weld and remainder of the tubing is substantially homogeneous.

Figures 6, 7, 8:
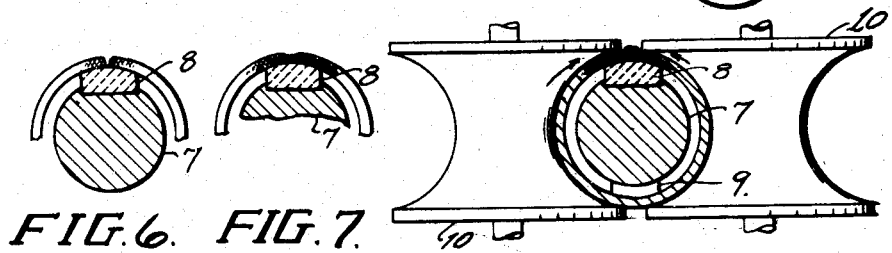
Fig. 6, 7 and 8 are cross sectional views of a tube illustrating progressive stages of the forming of the weld.

Referring to the drawings, Fig. 6, 7 and 8, Fig. 6 illustrates the heating effect of the first arc. In Fig. 7 the heat of previous arcs has spread into the adjacent metal somewhat and the upper portions of the original edges have started to melt. In Fig. 8 a portion of the metal has formed a pool confined between heated edges of the strip and the heat as spread farther out from the line of weld and through the stock.

In Fig. 8 is shown the effect of the upset producing rollers which force the open edges of the strip together, thus assuring complete filling of the seam, or perhaps a slight overflow so that no scale or foreign matter is left in the seam. In Fig. 3 the tube is shown as engaged by the upset reducing means. At this position the molten metal has somewhat solidified and its temperature gradually blends in with the temperature of the adjacent portion of the tube, a considerable portion of which may be heated.

Figure 5:
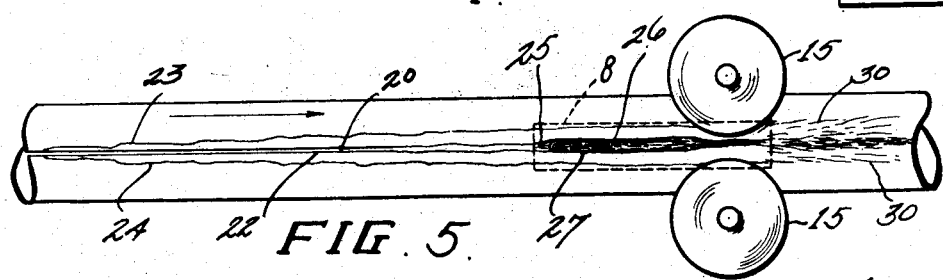
Fig. 5 is a plan view of a section of tubing on which is diagrammatically illustrated the heating effect of the arc units.

In Fig. 5 the right end of the tube is shown as cooled, the weld being practically homogeneous with the remainder of the tubing. The temperature of the whole gradually decreases so that the weld and adjacent metal are somewhat annealed and the original lines of the weld are blended into the metal stock. In this condition the scale or foreign matter may lie on the surface of the tube forming a slight irregularity which may be brushed or knocked off, producing a smooth practically seamless tube.

By these steps, the heated edges are brought into position to form a weld of proper upset and scale and foreign matter are carried out of the weld. The resulting weld is likewise rolled so that it conforms to the contour of the tube both inside and out, and is now practically homogeneous with the original stock.

It should be noted that the absorption of gases by metal is dependent upon the temperature thereof. For instance, in melting a metal, a definite volume of gases is absorbed with each increase in temperature, and upon cooling, these gases are in turn ejected. Since the stock, or a portion thereof, is heated as well as the portion actually welded, the heat of the weld does not radiate or dissipate so quickly through the metal, but passes off comparatively slowly. As a result of this slower cooling operation the gases absorbed during the welding process are ejected from the metal and porosity is eliminated.

On the other hand if this metal is not heated adjacent to the weld there is a tendency for the weld to cool quickly and trap the gases, with the result that the metal is considerably weakened and more porous. Due to the comparatively slow cooling the weld and adjacent portion of the tubing are somewhat annealed and normalized, producing a more uniform grain structure and a weld of better quality and eliminating the usual shrinkage strains.

It will be seen that it is of the essence of this invention to create a long narrow molten pool between edges to be welded. This ditch of molten metal extending along the seam for a distance of from several times the thickness of the stock to many times the thickness of the stock may be created at very high speeds of movement of the stock by the use of the cumulative or increment effect of the series of arcs as described.

By the use of my invention, if a given speed of welding a seam on a certain thickness of cold stock be attained it follows that by preheating in any suitable manner greater speeds may be reached for the reason that the arcs will raise the stock to welding temperature, in less time, starting from higher temperatures.

I contemplate the use of the process of this invention in the welding of hot stock taken from the rolling or "strip" mill before it is allowed to cool. From the foregoing it is clear that this may be done inasmuch as the edges and surfaces need no preparatory treatment. The adaptation of the invention to a continuous process, utilizing the original heat in the stock coming from the rolling mill is set forth in my application for patent Serial No. 475,948, filed Aug. 18, 1930.

I claim:

1. A continuous process of welding metal tubing from strip metal stock which consists of moving the strip along a given path, forming said strip into substantially tubular form with the original edges close to each other to form an open seam cleft while so moving and passing the edges of the seam of said strip through an elongated heating zone whereby the temperature of said edges is gradually increased to melting temperature and the edges melted for the full depth thereof and maintaining the molten metal of the edges in the molten condition and retaining it in the open seam cleft and supporting the under surface of the molten metal, to form a long narrow molten pool, whereby the metal is welded together along said seam.

2. A continuous process of welding metal members together which consists of moving the members along a given path while maintaining the edges close to each other to form a seam cleft and passing the edges of the seam cleft thus formed through an elongated heating zone whereby the temperature of the said edges is gradually increased to melting temperature and said edges melted for the full depth thereof and maintaining the molten metal in the melted condition and retaining it in the seam cleft to form a long narrow molten pool and bringing the members relatively toward each other whereby the width of the seam cleft is reduced and the cleft is filled with molten metal whereby the members are welded together along said edges for the full thickness thereof.

3. A continuous process of making welded metal tubing of strip metal stock which consists of moving the strip along a given path, forming said strip into substantially tubular form with the original edges close to each other to form an open seam cleft while so moving, and passing the edges of the seam cleft through an elongated heating zone whereby the temperature of said edges is increased to melting temperature and the edges melted for the full depth thereof, and maintaining the molten metal of the edges in a molten condition and retaining it in the open seam cleft to form a long narrow molten pool, moving the edges relatively toward each other whereby the width of the seam cleft is reduced and the cleft is filled with molten metal and a weld is formed for the full depth of the stock.

4. A continuous process of welding metal members together which consists of moving the members along a given path while maintaining the edges close to each other to form an open seam cleft and passing the edges of the open seam cleft thus formed through an elongated heating zone whereby the temperature of said edges is gradually increased to melting temperature and the edges melted for the full depth thereof, and maintaining the molten metal of the edges in the melted condition and retaining it in the open seam cleft to form a long narrow molten pool, whereby members are molded together.

In testimony whereof, I hereunto affix my signature.

ERNEST RIEMENSCHNEIDER.